US010560885B2

(12) United States Patent
Kudou

(10) Patent No.: US 10,560,885 B2
(45) Date of Patent: Feb. 11, 2020

(54) WIRELESS COMMUNICATION DEVICE

(71) Applicant: NEC Corporation, Minato-ku, Tokyo (JP)

(72) Inventor: Masato Kudou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 150 days.

(21) Appl. No.: 15/559,139

(22) PCT Filed: Mar. 16, 2016

(86) PCT No.: PCT/JP2016/001516
§ 371 (c)(1),
(2) Date: Sep. 18, 2017

(87) PCT Pub. No.: WO2016/152104
PCT Pub. Date: Sep. 29, 2016

(65) Prior Publication Data
US 2018/0084479 A1 Mar. 22, 2018

(30) Foreign Application Priority Data
Mar. 25, 2015 (JP) .................................. 2015-062275

(51) Int. Cl.
H04W 40/02 (2009.01)
H04W 48/08 (2009.01)
(Continued)

(52) U.S. Cl.
CPC ........... H04W 40/22 (2013.01); H04W 4/027 (2013.01); H04W 88/04 (2013.01)

(58) Field of Classification Search
None
See application file for complete search history.

(56) References Cited

U.S. PATENT DOCUMENTS

2002/0115448 A1  8/2002  Amerga et al.
2004/0174844 A1* 9/2004  Cho .................... H04L 12/1868
                                                    370/328
(Continued)

FOREIGN PATENT DOCUMENTS

JP  2004-518359 A  6/2004
JP  2006-500882 A  1/2006
(Continued)

OTHER PUBLICATIONS

Extended European Search Report for EP Application No. EP16768011.5 dated Aug. 16, 2018.
(Continued)

Primary Examiner — Duc T Duong

(57) ABSTRACT

A wireless communication device of the present invention has a device information storage part that stores device information identifying another wireless communication device that can establish wireless communication. When transmitting data, the wireless communication device attaches transmission source neighboring device information stored in the device information storage part of the device to the data, and transmits the data to another wireless communication device. When receiving data, the wireless communication device stores transmission source device information identifying another wireless communication device having transmitted the data into the device information storage part of the device. The wireless communication device determines whether to relay and transmit the received data to another wireless communication device on the basis of the result of comparison between the transmission source neighboring device information attached to the received data and receiver neighboring device information stored in the device information storage part of the device.

3 Claims, 7 Drawing Sheets

(51) Int. Cl.
    *H04W 84/18*    (2009.01)
    *H04W 40/22*    (2009.01)
    *H04W 88/04*    (2009.01)
    *H04W 4/02*     (2018.01)

(56) References Cited

U.S. PATENT DOCUMENTS

| | | | |
|---|---|---|---|
| 2005/0086369 A1* | 4/2005 | Mai | A63F 13/12 |
| | | | 709/239 |
| 2005/0097386 A1* | 5/2005 | Datta | A63F 13/12 |
| | | | 714/4.3 |
| 2006/0045064 A1* | 3/2006 | Qin | H04L 45/306 |
| | | | 370/351 |
| 2008/0002640 A1* | 1/2008 | Westphal | H04W 40/02 |
| | | | 370/338 |
| 2008/0170518 A1* | 7/2008 | Duggi | H04L 45/18 |
| | | | 370/310 |
| 2009/0122738 A1* | 5/2009 | Chen | H04H 20/08 |
| | | | 370/312 |
| 2009/0122775 A1 | 5/2009 | Haartsen | |
| 2013/0223286 A1* | 8/2013 | Corinella | H04W 84/18 |
| | | | 370/255 |
| 2013/0235758 A1 | 9/2013 | Delmas et al. | |
| 2015/0098382 A1 | 4/2015 | Duval et al. | |
| 2017/0099232 A1* | 4/2017 | Shepherd | H04L 45/74 |

FOREIGN PATENT DOCUMENTS

| | | |
|---|---|---|
| JP | 2008-154016 A | 7/2008 |
| JP | 2009-246899 A | 10/2009 |
| JP | 2013-005179 A | 1/2013 |
| JP | 2015-076878 A | 4/2015 |

OTHER PUBLICATIONS

Japanese Office Action for JP Application No. 2017-507480 dated Mar. 5, 2019 with English Translation.
International Search Report for PCT Application No. PCT/JP2016/001516, dated Jun. 7, 2016.

* cited by examiner

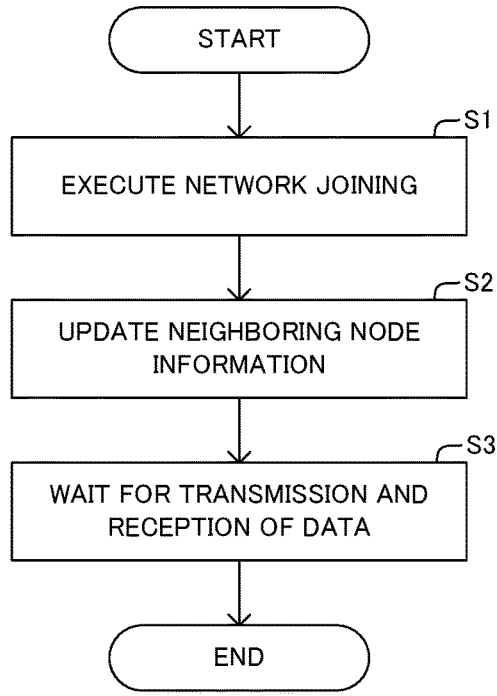
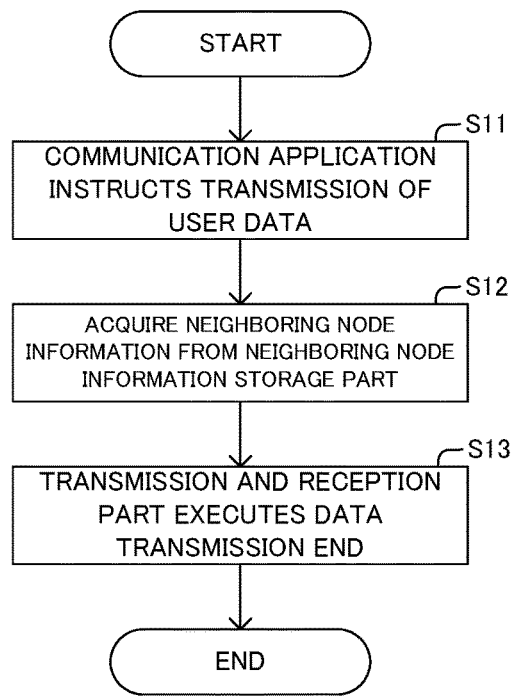

WIRELESS COMMUNICATION DEVICE

This application is a National Stage Entry of PCT/JP2016/001516 filed on Mar. 16, 2016, which claims priority from Japanese Patent Application 2015-062275 filed on Mar. 25, 2015, the contents of all of which are incorporated herein by reference, in their entirety.

TECHNICAL FIELD

The present invention relates to a wireless communication device. Specifically, the present invention relates to a wireless communication device which relays and transmits received data to another device.

BACKGROUND ART

A method for automatically relaying and distributing data to the whole network is, for example, a distribution method by flooding or a distribution method based on ad hoc routing.

Flooding is a method in which a communication node having received distribution data autonomously relays the distribution data one after another by using broadcast communication as in a bucket brigade. In distribution by flooding, there is no need to communicate data such as network control data for route construction other than data to actually distribute, and a bandwidth can be used only for distribution of the data to actually distribute. On the contrary, there is a problem that adding use of a bandwidth due to redundant relay of data between neighboring communication nodes easily occurs.

Further, flooding does not need a communication procedure relating to network control such as a communication procedure relating to route construction other than a procedure of transmission and reception of data to actually distribute, so that flooding is appropriate for communication between communication nodes including a high-speed mobile object. Although not only a simple flooding method but also a method for inhibiting adding use of a bandwidth is proposed herein, occurrence of excessive inhibition of data relay is anticipated even if which of the methods is used in a condition that the arrangement of communication nodes changes fast, for example, in a condition that a high-speed mobile object is included.

On the other hand, an ad hoc network is a wireless network which is temporarily formed by moving wireless communication devices and does not have a fixed infrastructure or a central management mechanism, and is also called Mobile Ad-hoc Network (referred to as MANET hereinafter). In ad hoc routing, a communication node autonomously relays distribution data on the basis of a route table generated by using a routing protocol for an ad hoc network.

A routing protocol is roughly divided into two types based on a timing to construct a route table. One of them is a proactive type that constructs a route by performing communication relating to network control for periodically causing a routing protocol to function independently of transmission and reception of data to actually distribute. The other is a reactive type that constructs a route by performing communication relating to network control for causing a routing protocol to function triggered by a request for transmission of data to actually distribute.

Such an ad hoc network is disclosed in Patent Document 1.

Patent Document 1: Japanese Unexamined Patent Application Publication No. JP-A 2006-500882

An ad hoc network requires a procedure of communication relating to network control for causing a routing protocol to function in addition to a procedure of transmission and reception of data to actually distribute as described above, and adding use of a bandwidth due to communication relating to network control occurs. Moreover, assuming communication between communication nodes including a high-speed mobile object, in a case where increase of the characteristic of following change of the arrangement of the nodes is intended, the proactive type requires a shorter interval to perform communication relating to network control, and the amount of adding use of a bandwidth due to communication relating to network control increases. On the other hand, the reactive type requires a procedure of communication relating to network control for route construction before transmission of data to actually distribute, and transmission of the data to actually distribute delays.

Thus, in constructing and maintaining an ad hoc wireless communication network which a plurality of wireless communication devices join, adding use of a bandwidth other than use of a bandwidth necessary for transmission and reception of data to actually distribute occurs. There is a problem that inhibiting such adding use of a bandwidth and increasing the characteristic of following a condition in which the arrangement of nodes largely changes, such as communication between communication nodes including a high-speed mobile object, are in a tradeoff relation and are hard to be compatible.

SUMMARY

Accordingly, an object of the present invention is to solve the problem provided above that in a wireless communication device relaying and transmitting data, it is difficult to increase the characteristic of following change of the arrangement of wireless communication devices while inhibiting adding use of a bandwidth.

A wireless communication device according to an aspect of the present invention includes:

a transmission and reception part configured to relay and transmit received data to another wireless communication device;

a device information storage part configured to store device information identifying another wireless communication device that can establish wireless communication; and a relay determination part configured to determine whether to relay received data to another wireless communication device.

The transmission and reception part is configured to:

when transmitting data, attach the device information stored in the device information storage part of the wireless communication device as transmission source neighboring device information to the data, and transmit the data to another wireless communication device; and when receiving data, store transmission source device information identifying another wireless communication device having transmitted the data into the device information storage part of the wireless communication device.

The relay determination part is configured to, on a basis of a result of comparison between the transmission source neighboring device information attached to the received data and receiver neighboring device information that is the device information stored in the device information storage part of the wireless communication device, determine whether to relay and transmit the received data to another wireless communication device.

A program according to another aspect of the present invention is a computer program including instructions for causing an arithmetic device included in a wireless communication device to realize:

a relay determination part configured to determine whether to relay received data to another wireless communication device; and a transmission and reception part configured to relay and transmit received data to another wireless communication device.

The transmission and reception part is configured to:

when transmitting data, attach device information identifying another wireless communication device that can establish wireless communication as transmission source neighboring device information to the data, and transmit the data to another wireless communication device, the device information being stored in a device information storage part included in the wireless communication device; and when receiving data, store transmission source device information identifying another wireless communication device having transmitted the data into the device information storage part of the wireless communication device.

The relay determination part is configured to, on a basis of a result of comparison between the transmission source neighboring device information attached to the received data and receiver neighboring device information that is the device information stored in the device information storage part included in the wireless communication device, determine whether to relay and transmit the received data to another wireless communication device.

A data relay method according to another aspect of the present invention is a data relay method executed by a wireless communication device to: determine whether to relay received data to another wireless communication device; and relay and transmit received data to another wireless communication device.

The method includes:

when transmitting data, attaching device information identifying another wireless communication device that can establish wireless communication as transmission source neighboring device information to the data, and transmitting the data to another wireless communication device, the device information being stored in a device information storage part included in the wireless communication device; and when receiving data, storing transmission source device information identifying another wireless communication device having transmitted the data into the device information storage part included in the wireless communication device; and when determining whether to relay data, on a basis of a result of comparison between the transmission source neighboring device information attached to the received data and receiver neighboring device information that is the device information stored in the device information storage part of the wireless communication device, determining whether to relay and transmit the received data to another wireless communication device.

With the configurations described above of the present invention, in a wireless communication device which relays and transmits data, it is possible to increase the characteristic of following change of the arrangement of wireless communication devices while inhibiting adding use of a bandwidth.

BRIEF DESCRIPTION OF DRAWINGS

FIG. 3 is a flowchart showing an operation of the relay communication device disclosed in FIG. 1;

FIG. 4 is a flowchart showing an operation of the relay communication device disclosed in FIG. 1;

EXEMPLARY EMBODIMENTS

First Exemplary Embodiment

Figure 1:
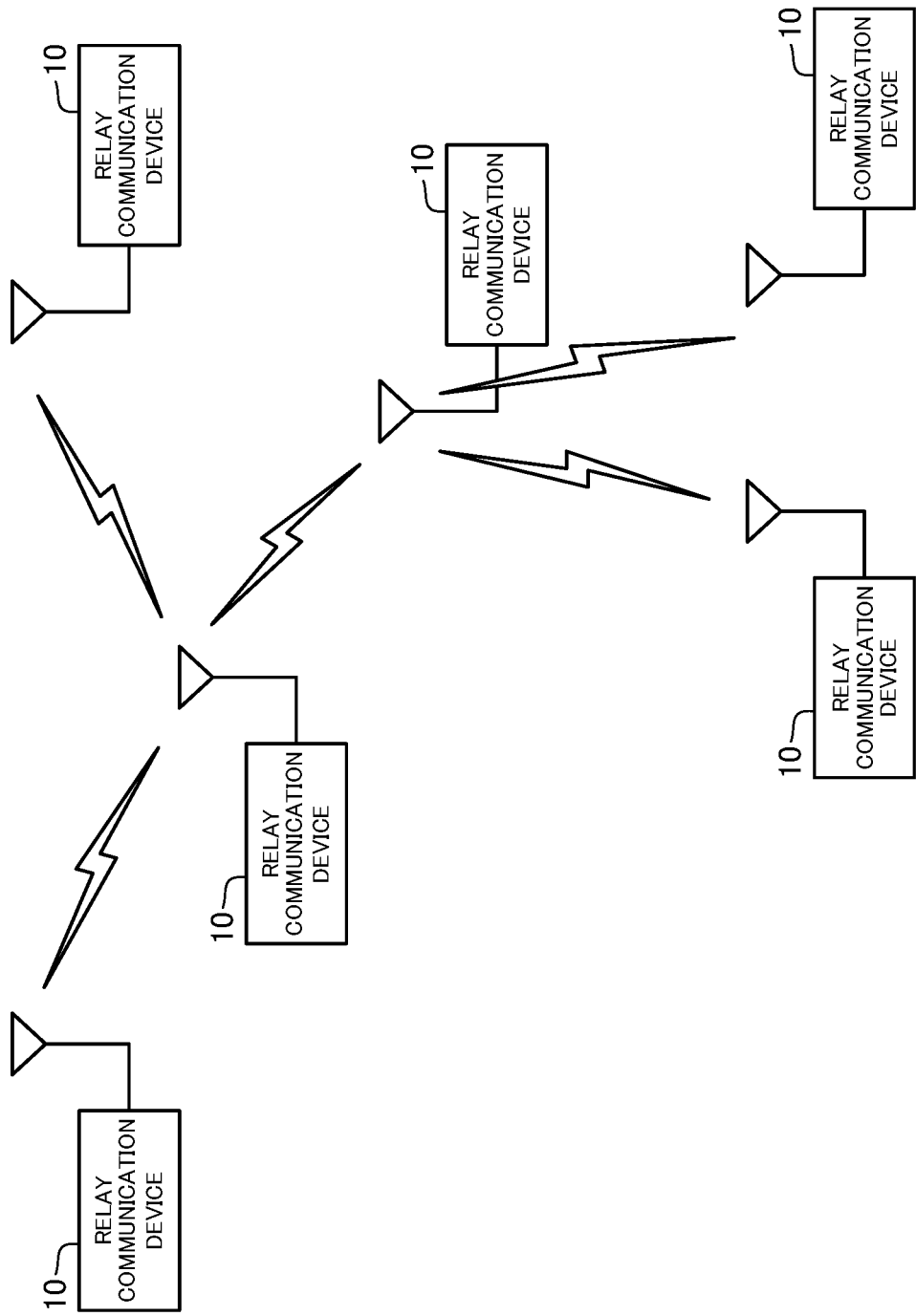
FIG. 1 is a block diagram showing the overall configuration of a wireless automatic communication network according to the present invention.

FIG. 1 shows an example of the configuration of a wireless automatic relay network in this exemplary embodiment. As shown in FIG. 1, the wireless automatic communication network is composed of a plurality of relay communication devices 10 (wireless communication devices (nodes). Each of the relay communication devices 10 has a function to, when receiving data by wireless communication, automatically relay and transmit the data by wireless communication to another of the relay communication devices 10 that is located in a range where wireless communication can be established.

Figure 2:
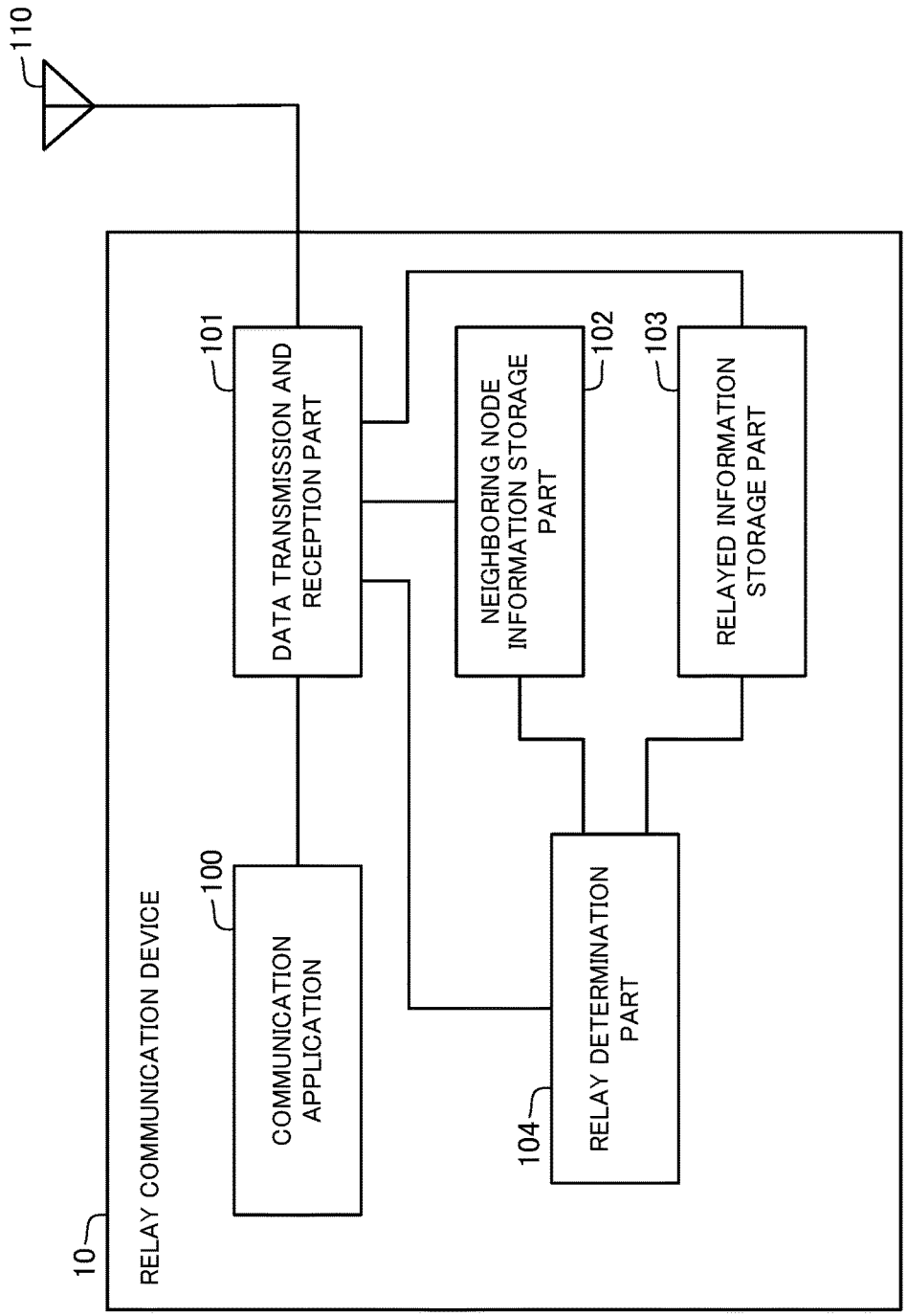
FIG. 2 is a block diagram showing a configuration of a relay communication device disclosed in FIG. 1.

FIG. 2 shows an example of the configuration of the relay communication device 10. The relay communication device 10 has a communication part including an antenna 110, an arithmetic device, and a storage device. Then, the relay communication device 10 has a communication application 100, a data transmission and reception part 101 (a transmission and reception part) and a relay determination part 104 which are constructed by execution of a program by the arithmetic device. Moreover, the relay communication device 10 has a neighboring node information storage part 102 (a device information storage part) and a relayed information storage part 103 which are formed in the storage device.

The communication application 100 is a communication software that performs data communication such as voice communication, video distribution and Web via the data transmission and reception part 101 and the communication part.

The data transmission and reception part 101 transmits and receives radio waves via the communication part by any wireless communication method to perform communication data transmission with another relay communication device 10, and also sends received data to the communication application 100.

In the neighboring node information storage part 102, neighboring node information, which is information identifying another relay communication device 10 in a state able to establish direct wireless communication with its relay communication device 10, is stored. Moreover, in the neighboring node information storage part 102, neighboring node information attached to data transmitted by another relay communication device 10 is also stored.

In the relayed information storage part 103, information based on data having been relayed and transmitted by its relay communication device 10 is stored.

When the data transmission and reception part 101 of its relay communication device 10 receives data from another relay communication device 10, the relay determination part 104 refers to neighboring node information stored in the neighboring node information storage part 102 and other information, and determines whether relay of the data is required or not. When determining relay of the data is required, the relay determination part 104 instructs the data transmission and reception part 102 to relay the data.

The communication application 100, the neighboring node information storage part 102, the relayed information storage part 103, and the relay determination part 104 may be implemented in a different device housing, not in the same device housing.

Below, a detailed configuration and operation of each of the components 100 to 104 provided above will be described. First, an operation when the relay communication device 10 executes a network joining execution process in prior to data communication with another relay communication device 10 will be described with reference to FIG. 3.

The data transmission and reception part 101 runs a predetermined network joining protocol and transitions to a state able to communicate with another relay communication device 10 (step S1). The network joining protocol is a communication procedure for a communication control process such as time synchronization, timing synchronization of communication frames, adjustment of a used frequency, adjustment of a used modulation method, assignment of a used communication slot, and joining authentication with another relay communication device 10.

Subsequently, the data transmission and reception part 101 stores information, generated accompanied by the operation of the network joining protocol, of the other relay communication device 10 serving as a communication counterpart into the neighboring node information storage part 102 (step S2). For example, the data transmission and reception part 101 stores neighboring node information (device information) that is information identifying another relay communication device 10 which is located in a wireless communication range of its relay communication device 10 and is thereby capable of establishing wireless communication with its relay communication device 10, into the neighboring node information storage part 102. Meanwhile, in a case where neighboring node information is already stored in the neighboring node information storage part 102, the data transmission and reception part 101 updates the neighboring node information by adding newly detected neighboring node information or by rewriting the neighboring node information to new neighboring node information.

Subsequently, the data transmission and reception part 101 sends network joining completion notification to the communication application 100. The communication application starts waiting for transmission and reception of data (step S3).

Next, with reference to FIG. 4, an example of the flow of a data transmission process by the relay communication device 10 will be described. First, triggered by instruction by the user or execution of various information processing functions implemented in the communication application 100, the communication application 100 instructs the data transmission and reception part 101 to transmit user data (step S11). Then, the data transmission and reception part 101 acquires neighboring node information of its relay communication device 10 stored in the neighboring node information storage part 102 of its relay communication device 10 (step S12). Then, the data transmission and reception part 101 attaches control data including the acquired neighboring node information (transmission source neighboring device information) to data to transmit, and transmits the data to the other relay communication device 10 (step S13).

Control data attached to data to transmit includes transmission source node information (device information (transmission source device information)) that is information identifying the relay communication device 10, namely, the source of transmission of data to transmit. Moreover, control data attached to data to transmit includes destination information showing a destination that is the destination of transmission of the data to transmit, and an identifier (identification information) such as a sequence number that identifies the data to transmit. In summary, in transmitting data, the data transmission and reception part 101 attaches control data including neighboring node information of its relay communication device 10, transmission source node information, destination information and an identifier of the transmission data, to transmission data, and transmits the transmission data to the other relay communication device 10.

The control data can include all or part of the information provided above, and may include still other information. The information included in the control data may be subjected to data compression by a method such as hashing.

Further, after transmitting data, the data transmission and reception part 101 waits a predetermined time period for return of reception notification or the like from another relay communication device 10 included in the neighboring node information of its relay communication device accumulated in the neighboring node information storage part 102. The data transmission and reception part 101 may be configured to retransmit the transmission data in a case where there is another relay communication device 10 having not returned anything.

Further, as described later, when receiving data from another relay communication device 10, the data transmission and reception part 101 regards the received data as transmission data as described above, attaches control data to the transmission data, and relays and transmits the data to still another relay communication device 10.

Then, after relaying and transmitting data, the data transmission and reception part 101 stores relayed information, which is a pair of an identifier in control data attached at the time of reception of the data and neighboring node information (transmitted neighboring node information) of its relay communication device stored in the neighboring node information storage part 102 of its relay communication device 10, into the relayed information storage part 103. The relayed information is used later when the relay determination part 104 determines whether or not to relay and transmit received data to another relay communication device 10.

Next, with reference to FIG. 5, an example of the flow of a data reception process in this exemplary embodiment will be described. First, the data transmission and reception part 101 receives data transmitted by another relay communication device 10 (step S21). The data transmission and reception part 101 may be configured to then return notification of data reception. In the description of the data reception process, another relay communication device 10 having transmitted data received by the relay communication device 10 will be referred to as a data transmission source.

Subsequently, the data transmission and reception part 101 stores information stored in the other relay communication device 10 that is the data transmission source into the neighboring node information storage part 102 (step S22). To be specific, the data transmission and reception part 101 stores transmission source node information (transmission source device information) included in control data attached to the received data, as neighboring node information into the neighboring node information storage part 102. In other words, the data transmission and reception part 101 adds the transmission source node information to neighboring node information (receiver neighboring device information) already stored in the neighboring node information storage part 102.

Then, the data transmission and reception part 101 may also store neighboring node information (transmission source neighboring device information) of the data transmission source relay communication device 10, included in the control data attached to the received data, as neighboring node information into the neighboring node information storage part 102. The data transmission and reception part 101 thus updates the neighboring node information in the neighboring node information storage part 102, and the information is used for determination whether or not it is required to relay as described later.

Meanwhile, the neighboring node information of the data transmission source relay communication device 10 attached to the received data (i.e., transmission source neighboring device information) does not need to be necessarily stored in the neighboring node information storage part 102. The data transmission and reception part 101 can store at least the transmission source node information attached to the received data, as the neighboring node information into the neighboring node information storage part 102.

Subsequently, the data transmission and reception part 101 extracts destination information included in the control data attached to the received data, and checks whether or not the destination of the received data is only its device (step S23). In the case of determining that the destination is only its device (step S23, Yes), the data transmission and reception part 101 transmits the received data to the communication application 100 (step S30), and ends the process. On the other hand, in the case of determining that the destination of the received data includes a device other than its device (step S23, No), the relay determination part 104 determines whether or not to relay the received data to another wireless communication device.

Next, the process to determine whether or not to relay the received data will be described in detail. First, the relay determination part 104 compares the neighboring node information in the control data attached to the received data (i.e., the neighboring node information of the data transmission source relay communication device 10 (the transmission source neighboring device information)) with the neighboring node information of its device accumulated in the neighboring node information storage part 102 of its device 10 (i.e., the receiver neighboring device information). Then, the relay determination part 104 checks whether or not there is a difference between the compared neighboring node information (step S24). In a case where there is no difference (step S24, No), the relay determination part 104 determines there is no relay destination candidate node. This is because the relay determination part 104 can determine that even if its device 10 relays the data, the data reaches only still another relay communication device 10 having already received the data from the data transmission source other relay communication device 10. On the other hand, in a case where there is a difference between the compared neighboring node information (step S24, Yes), the relay determination part 104 determines there is a relay destination candidate node, and performs the next relay determination process.

Subsequently, the relay determination part 104 extracts an identifier in the control data attached to the received data, and determines whether or not it is required to relay on the basis of the identifier (step S25). To be specific, the relay determination part 104 checks whether or not relayed information with which an identifier identical to the identifier extracted from the received data is associated is stored in the relayed information storage part 103. In a case where such relayed information is stored, the relay determination part 104 compares neighboring node information included in the stored relayed information (i.e., transmitted neighboring device information) with the neighboring node information in the control data attached to the received data (i.e., the transmission source neighboring device information), and checks a difference between the information. In a case where there is no difference (step S25, No), the relay determination part 104 determines it is not required to relay. This is because the relay determination part 104 can determine in this case that its device 10 has already relayed the data to the neighboring node. On the other hand, in a case where there is a difference between the compared neighboring node information (step S25, Yes), the relay determination part 104 determines it is required to relay, and performs the next relay determination process.

Also in a case where relayed information with which an identifier identical to the identifier extracted from the received data is associated is not stored in the relayed information storage part 103 (step S25, Yes), the relay determination part 104 determines it is required to relay. Meanwhile, as described before, the process to determine whether or not relayed information is stored and the process to compare the information included in the relayed information with the information attached to the received data are not necessarily performed and may be omitted.

Subsequently, the relay determination part 104 compares the neighboring node information in the control data attached to the received data (i.e., the neighboring node information of the data transmission source relay communication device 10 (the transmission source neighboring device information)) with its neighboring node information stored in the neighboring node information storage part 102 of its device 10 (i.e., the receiver neighboring device information). Then, the relay determination part 104 checks whether or not its neighboring node information is a subset of the neighboring node information attached to the received data (step S26). In a case where its neighboring node information is a subset (step S26, No), the relay determination part 104 determines it is not required to relay. This is because the relay determination part 104 can determine that even if its device 10 relays the data, the data does not reach still another relay communication device 10 having already received the data transmitted from the data transmission source other relay communication device 10. On the other hand, in the case of determining its neighboring node information is not a subset (step S26, Yes), the relay determination part 104 determines it is required to relay. Then, the relay determination part 104 instructs the data transmission and reception part 101 to relay and transmit the received data (step S27).

The processes at steps S23 to S26 described above may be executed in any order. Moreover, a plurality of processes may be executed together; for example, steps S24 and S26 may be executed together.

As described at steps S12 and S13 of FIG. 4, the data transmission and reception part 101 having been instructed to relay by the relay determination part 104 executes a process to transmit the received data to another relay communication device 10 (step S27). In other words, the data transmission and reception part 101 attaches control data, including transmission source node information identifying its device (i.e., transmission source device information) and neighboring node information stored in the neighboring node information storage part 102 of its device 10 (i.e., transmission source neighboring device information), to the received data, and relays and transmits the data to another relay communication device 10.

After that, the data transmission and reception part 101 stores relayed information, which is a pair of the identifier in the control data attached to the received data and its neighboring node information stored in the neighboring node information storage part 102 of its device 10 (i.e., transmitted device information), into the relayed information storage part 103 (step S28).

Further, the data transmission and reception part 101 checks whether or not its device 10 is included in destination information included in the control data attached to the received data (step S29). In a case where its device 10 is not included (step S29, No), the data transmission and reception part 101 ends the process. On the other hand, in a case where its device 10 is included (step S29, Yes), the data transmission and reception part 101 transmits the received data to the communication application 100 (step S30), and then ends the process.

Next, with reference to FIG. 6, an example of the flow of a process of maintenance of neighboring node information in this exemplary embodiment will be described.

First, as described above, when storing neighboring node information into the neighboring node information storage part 102, the data transmission and reception part 101 sets a predetermined valid period for the neighboring node information and stored it (step S41). This valid period may be, for example, a preset period or may be a period set in accordance with a movement status of another relay communication device 10 having transmitted neighboring node information or of its device 10 as described later.

Then, the data transmission and reception part 101 checks whether or not there is neighboring node information whose valid period has been expired in the neighboring node information storage part 102 at any timing, for example, at preset time intervals (step S42). In a case where there is no neighboring node information whose valid period has been expired (step S42, No), the data transmission and reception part 101 waits for a next timing to check. In a case where there is neighboring node information whose valid period has been expired (step S42, Yes), the data transmission and reception part 101 deletes the neighboring node information whose valid period has been expired from the neighboring node information storage part 102 (step S43).

Thus, according to the present invention, a characteristic of following change of the location status of the relay communication device 10 can be secured while the relay communication device 10 prevents occurrence of a adding use of a bandwidth due to communication of control data for communication path control. In other words, it is possible to speedily follow a condition that a status change is severe, such as communication between high-speed mobile objects, and even if the scale of a network increases, it is also possible to keep the amount of use of a band accompanied by data communication from explosively increasing. Moreover, it is also possible to configure a relay communication device which can relay data without involvement from a communication application.

Second Exemplary Embodiment

Figure 7:
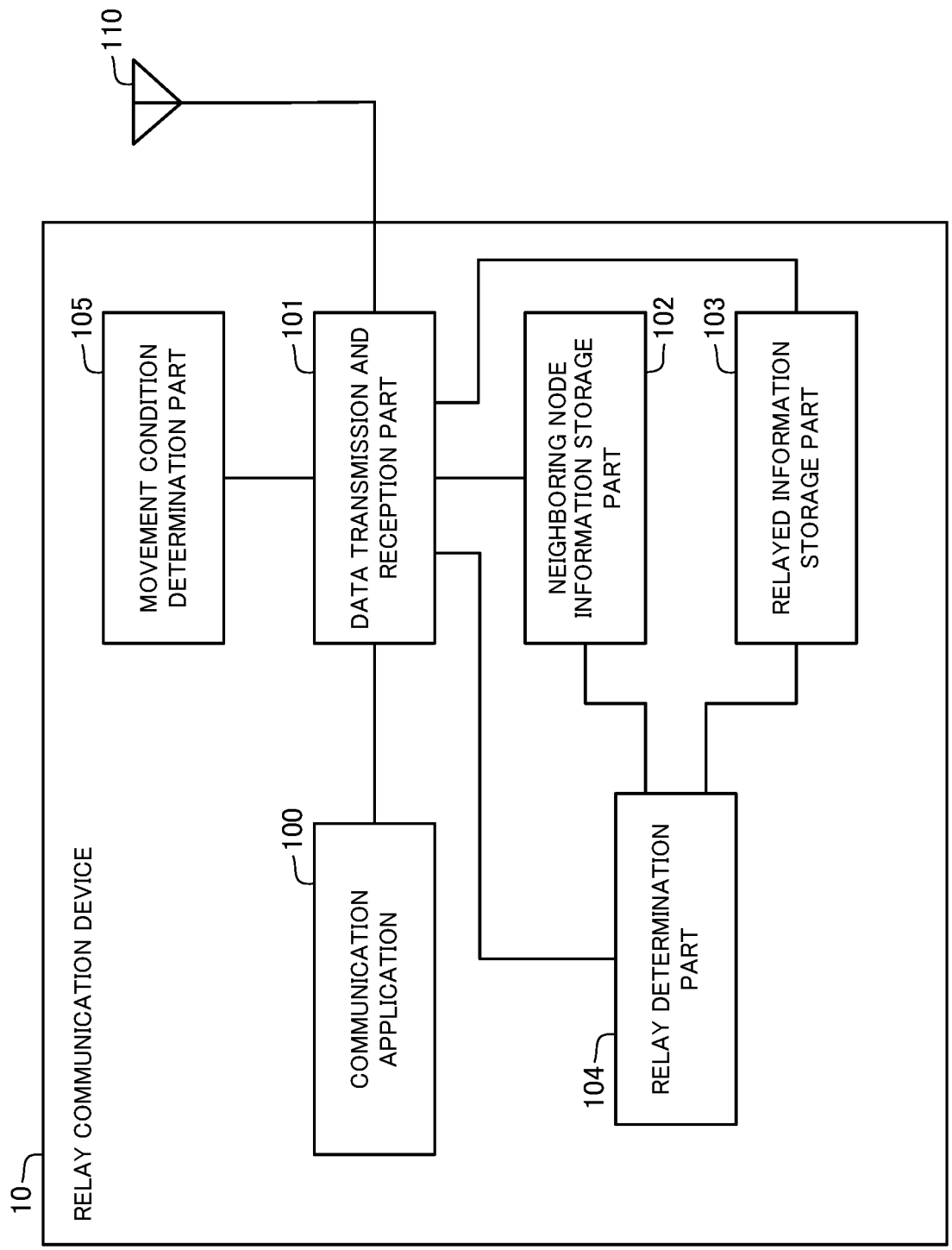
FIG. 7 is a block diagram showing another configuration of the relay communication device disclosed in FIG. 1.

Next, a second exemplary embodiment of the present invention will be described with reference to FIG. 7. FIG. 7 is a diagram showing a configuration of the relay communication device 10 in this exemplary embodiment. Below, a different configuration from that of the first exemplary embodiment will be chiefly described.

As shown in FIG. 7, the relay communication device 10 in this exemplary embodiment includes a movement condition determination part 105 structured by execution of a program by the arithmetic device, in addition to the components described in the first exemplary embodiment. The movement condition determination part 105 may be implemented in a different device housing from that of the other components, not in the same device housing.

The movement condition determination part 105 grasps position information of its device 10 and determines the movement condition of its device 10. For example, the movement condition determination part 105 detects the amount of movement per unit time and the direction of movement of its device 10 by using information of GPS or the like, and generates movement condition information including such values. The determination of a movement condition is performed at fixed time intervals, for example.

Then, in the process at step S12 of FIG. 4 described above, the data transmission and reception part 10 includes the movement condition information representing the movement condition of its device 10 into control data attached to data to transmit. In other words, the data transmission and reception part 10 attaches the movement condition information of its device 10 to data to transmit and transmits the data.

Figure 5:
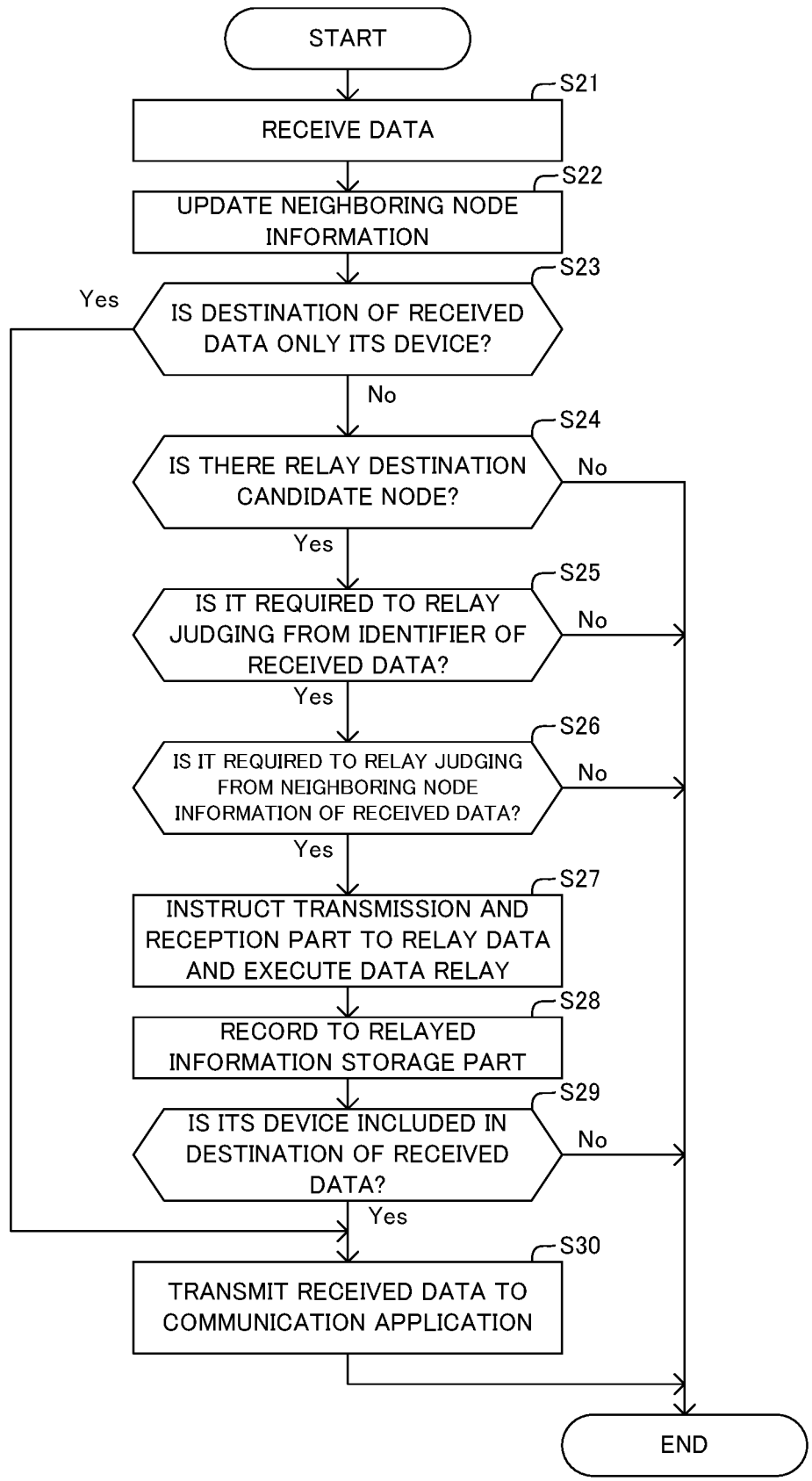
FIG. 5 is a flowchart showing an operation of the relay communication device disclosed in FIG. 1.

Further, in the process at step S22 of FIG. 5 described above, the data transmission and reception part 101 of the relay communication device 10 having received the transmitted data as described above stores transmission source node information (transmission source device information) and neighboring node information (transmission source neighboring device information), which are device information attached to the received data, into the neighboring node information storage part 102. At this time, the data transmission and reception part 101 sets a valid period corresponding to the movement condition information of the relay communication device 10 that is a transmission source attached to the received data, for device information such as transmission source node information and neighboring node information, and stores them. A valid period set in accordance with movement condition information may be set by any method; for example, a shorter period is set as the movement speed of the transmission source relay communication device 10 is higher, or a shorter period is set as the movement direction is a direction leaving from its device 10.

Further, the data transmission and reception part 101 may cause the movement condition determination part 105 of its device to determine the movement condition of its device 10 and, in accordance with the movement condition of the device 10, set a valid period of neighboring node information attached to received data. For example, the data transmission and reception part 101 may set a shorter valid period as the movement speed of its device 10 is faster, or set a valid period corresponding to a value of a difference in distance or speed or a difference in movement direction between its device and an another relay communication terminal 10 that is a neighboring node information transmission source.

The data transmission and reception part 101 may set a valid period of neighboring node information on the basis of both the movement condition information of the relay communication terminal 10 that is a received data transmission source and the movement condition information of its device 10, or may set the valid period on the basis of one of the movement condition information described above.

Figure 6:
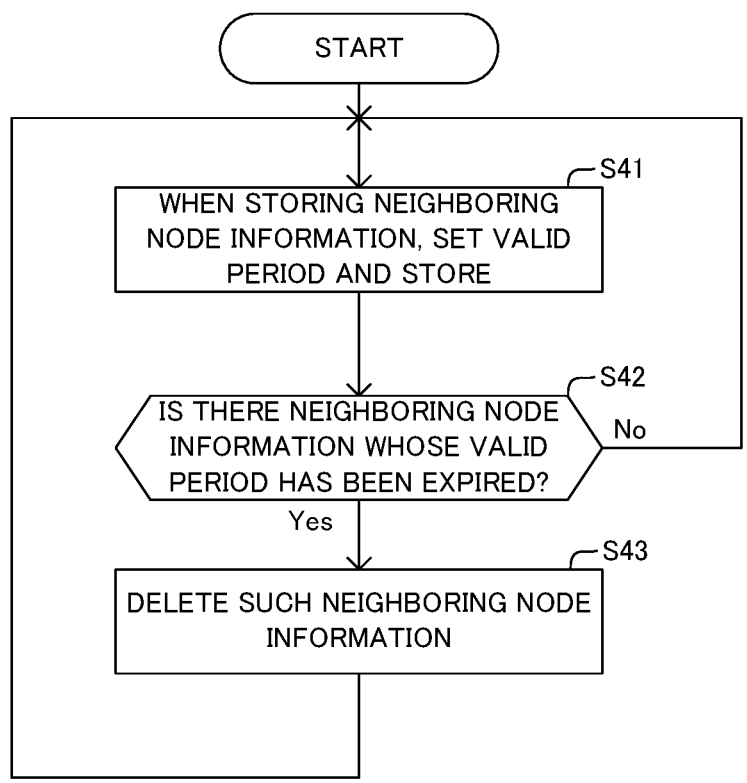
FIG. 6 is a flowchart showing an operation of the relay communication device disclosed in FIG. 1.

Then, in the same manner as the operation in FIG. 6 described above, the data transmission and reception part 101 checks at any timing whether there is neighboring node information whose valid period has been expired in the neighboring node information storage part 102, and deletes the neighboring node information whose valid period has been expired from the neighboring node information storage part 102.

Thus, the relay communication device 10 can suppress occurrence of a adding use of a bandwidth due to communication of control data for communication path control and also increase a characteristic of following change of the location condition of the relay communication device 10. In other words, it is possible to further decrease the frequency of occurrence of unnecessary data relay even in a condition that a status change is severe as in communication between high-speed mobile objects.

Movement condition information representing the movement condition of the relay communication device 10 determined by the movement condition determination part 105 may be used for determination whether or not it is required to relay received data. For example, the relay determination part 104 estimates a distance from and a relative movement direction with respect to another relay communication device 10 which is the destination of transmission of data from movement condition information of its device 10, and determines whether or not it is finally required to relay for each of the other relay communication devices 10 in accordance with the result of the estimation. In the case of also acquiring movement condition information of another relay communication device 10 from this device 10 by any method, on the basis of both the movement condition information of its device 10 and the movement condition information of the other relay communication device 10, the relay determination part 104 may determine whether or not it is finally required to relay data for the other relay communication device 10.

<Supplementary Notes>

Figure 8:
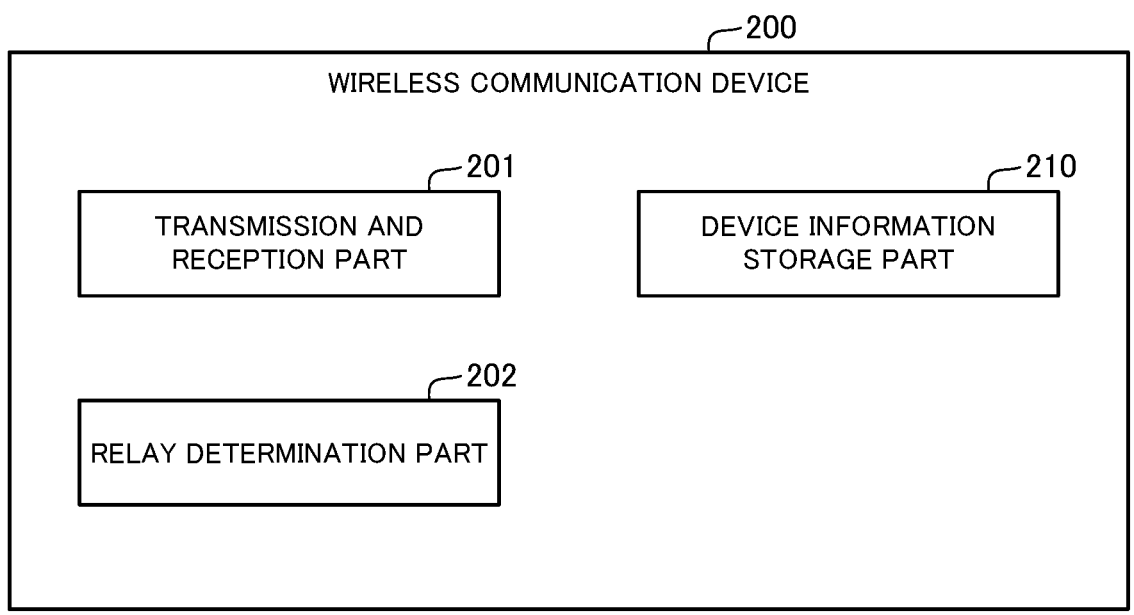
FIG. 8 is a block diagram showing a configuration of a wireless communication device according to the present invention.

The whole or part of the exemplary embodiments disclosed above can be described as the following supplementary notes. Below, the overview of configurations of a wireless communication device (see FIG. 8), a program and a data relay method according to the present invention will be described. However, the present invention is not limited to the following configurations.

(Supplementary Note 1)

A wireless communication device 200 comprising:
a transmission and reception part 201 configured to relay and transmit received data to another wireless communication device;
a device information storage part 210 configured to store device information identifying another wireless communication device that can establish wireless communication; and
a relay determination part 202 configured to determine whether to relay received data to another wireless communication device, wherein:

the transmission and reception part 201 is configured to:
when transmitting data, attach the device information stored in the device information storage part of the wireless communication device as transmission source neighboring device information to the data, and transmit the data to another wireless communication device; and
when receiving data, store transmission source device information identifying another wireless communication device having transmitted the data into the device information storage part of the wireless communication device; and the relay determination part 202 is configured to, on a basis of a result of comparison between the transmission source neighboring device information attached to the received data and receiver neighboring device information that is the device information stored in the device information storage part of the wireless communication device, determine whether to relay and transmit the received data to another wireless communication device.

(Supplementary Note 2)

The wireless communication device according to Supplementary Note 1, wherein:
the transmission and reception part is configured to, when receiving data, store the transmission source neighboring device information attached to the received data as the receiver neighboring device information into the device information storage part of the wireless communication device; and the relay determination part is configured to, on a basis of a result of comparison between the transmission source neighboring device information attached to the received data and the receiver neighboring device information stored in the device information storage part of the wireless communication device, determine whether to relay and transmit the received data to another wireless communication device.

(Supplementary Note 3)

The wireless communication device according to Supplementary Note 1 or 2, wherein the relay determination part is configured to, in a case where the transmission source neighboring device information attached to the received data does not agree with the receiver neighboring device information stored in the device information storage part of the wireless communication device, relay and transmit the received data to another wireless communication device.

(Supplementary Note 4)

The wireless communication device according to any of Supplementary Notes 1 to 3, wherein the relay determination part is configured to, in a case where the receiver neighboring device information stored in the device information storage part of the wireless communication device is a subset of the transmission source neighboring device information attached to the received data, determine not to relay the received data to another wireless communication device and, in a case where the receiver neighboring device information is not the subset, determine to relay and transmit the received data to another wireless communication device.

(Supplementary Note 4.1)

The wireless communication device according to any of Supplementary Notes 1 to 4, comprising a relayed information storage part configured to store information based on relayed and transmitted data, wherein:
the transmission and reception part is configured to, when transmitting data, attach identification information identifying the data to the data and transmit the data to another wireless communication device, and also store the identification information identifying the transmitted data into the relayed information storage part; and the relay determination part is configured to, in a case where information corresponding to the identification information of the received data attached to the data is not stored in the relayed information storage part, determine to relay and transmit the received data to another wireless communication device.

(Supplementary Note 5)

The wireless communication device according to any of Supplementary Notes 1 to 4, comprising a relayed information storage part configured to store information based on relayed and transmitted data, wherein:

the transmission and reception part is configured to, when transmitting data, attach identification information identifying the data to the data and transmit the data to another wireless communication device, and also store the identification information identifying the transmitted data and transmitted device information into the relayed information storage part so as to be associated with each other, the transmitted device information being the device information stored in the device information storage part of the wireless communication device; and the relay determination part is configured to, in a case where information corresponding to the identification information of the received data attached to the data is stored in the relayed information storage part and the transmitted device information stored in the relayed information storage part is different from the transmission source neighboring device information attached to the received data, determine to relay and transmit the received data to another wireless communication device.

(Supplementary Note 6)

The wireless communication device according to any of Supplementary Notes 1 to 5, wherein the transmission and reception part is configured to, when receiving data, attach valid period information to the transmission source neighboring device information to be stored into the device information storage part, and delete the transmission source neighboring device information stored in the device information storage part on a basis of the valid period information.

(Supplementary Note 7)

The wireless communication device according to Supplementary Note 6, comprising a movement condition determination part configured to determine a movement condition of the wireless communication device, wherein the transmission and reception part is configured to, in accordance with movement condition information showing the movement condition of the wireless communication device, set the valid period information to be attached to the transmission source neighboring device information to be stored into the device information storage part.

(Supplementary Note 8)

The wireless communication device according to Supplementary Note 6, comprising a movement condition determination part configured to determine a movement condition of the wireless communication device, wherein the transmission and reception part is configured to:

when transmitting data, attach movement condition information showing the movement condition of the wireless communication device to the data, and transmit the data to another wireless communication device; and when receiving data, in accordance with the movement condition information attached to the received data and showing the movement condition of another wireless communication device having transmitted the data, set the valid period information to be attached to the transmission source neighboring device information to be stored into the device information storage part.

(Supplementary Note 9)

A computer program comprising instructions for causing an arithmetic device included in a wireless communication device to realize:

a relay determination part configured to determine whether to relay received data to another wireless communication device; and a transmission and reception part configured to relay and transmit received data to another wireless communication device, wherein:

the transmission and reception part is configured to:

when transmitting data, attach device information identifying another wireless communication device that can establish wireless communication as transmission source neighboring device information to the data, and transmit the data to another wireless communication device, the device information being stored in a device information storage part included in the wireless communication device; and when receiving data, store transmission source device information identifying another wireless communication device having transmitted the data into the device information storage part of the wireless communication device; and the relay determination part is configured to, on a basis of a result of comparison between the transmission source neighboring device information attached to the received data and receiver neighboring device information that is the device information stored in the device information storage part included in the wireless communication device, determine whether to relay and transmit the received data to another wireless communication device.

(Supplementary Note 9.1)

The computer program according to Supplementary Note 9, wherein:

the transmission and reception part is configured to, when receiving data, store the transmission source neighboring device information attached to the received data as the receiver neighboring device information into the device information storage part of the wireless communication device; and the relay determination part is configured to, on a basis of a result of comparison between the transmission source neighboring device information attached to the received data and the receiver neighboring device information stored in the device information storage part of the wireless communication device, determine whether to relay and transmit the received data to another wireless communication device.

(Supplementary Note 9.2)

The computer program according to Supplementary Note 9 or 9.1, wherein:

the transmission and reception part is configured to, when transmitting data, attach identification information identifying the data to the data and transmit the data to another wireless communication device, and also store the identification information identifying the transmitted data into the relayed information storage part included in the wireless communication device; and the relay determination part is configured to, in a case where information corresponding to the identification information of the received data attached to the data is not stored in the relayed information storage part, determine to relay and transmit the received data to another wireless communication device.

(Supplementary Note 9.3)

The computer program according to Supplementary Note 9 or 9.1, wherein:

the transmission and reception part is configured to, when transmitting data, attach identification information identifying the data to the data and transmit the data to another wireless communication device, and also store the identification information identifying the transmitted data and transmitted device information into a relayed information storage part included in the wireless communication device so as to be associated with each other, the transmitted device information being the device information stored in the device information storage part of the wireless communication device; and the relay determination part is configured to, in a case where information corresponding to the identification information of the received data attached to the data is stored in the relayed information storage part and the transmitted device information stored in the relayed information storage part is different from the transmission source neighboring device information attached to the received data, determine to relay and transmit the received data to another wireless communication device.

(Supplementary Note 9.4)

The computer program according to any of Supplementary Notes 9 to 9.3, wherein the transmission and reception part is configured to, when receiving data, attach valid period information to the device information to be stored into the device information storage part, and delete the device information stored in the device information storage part on a basis of the valid period information.

(Supplementary Note 9.5)

The computer program according to Supplementary Note 9.4, comprising instructions for causing the arithmetic device to further realize a movement condition determination part configured to determine a movement condition of the wireless communication device, wherein the transmission and reception part is configured to, in accordance with movement condition information showing the movement condition of the wireless communication device, set the valid period information to be attached to the device information to be stored into the device information storage part.

(Supplementary Note 9.6)

The computer program according to Supplementary Note 9.4, comprising instructions for causing the arithmetic device to further realize a movement condition determination part configured to determine a movement condition of the wireless communication device, wherein the transmission and reception part is configured to:

when transmitting data, attach movement condition information showing the movement condition of the wireless communication device to the data, and transmit the data to another wireless communication device; and when receiving data, in accordance with the movement condition information attached to the received data and showing the movement condition of another wireless communication device having transmitted the data, set the valid period information to be attached to the device information to be stored into the device information storage part.

(Supplementary Note 10)

A data relay method executed by a wireless communication device to:

determine whether to relay received data to another wireless communication device; and relay and transmit received data to another wireless communication device, the method comprising:

when transmitting data, attaching device information identifying another wireless communication device that can establish wireless communication as transmission source neighboring device information to the data, and transmitting the data to another wireless communication device, the device information being stored in a device information storage part included in the wireless communication device; and when receiving data, storing transmission source device information identifying another wireless communication device having transmitted the data into the device information storage part included in the wireless communication device; and when determining whether to relay data, on a basis of a result of comparison between the transmission source neighboring device information attached to the received data and receiver neighboring device information that is the device information stored in the device information storage part of the wireless communication device, determining whether to relay and transmit the received data to another wireless communication device.

(Supplementary Note 10.1)

The data relay method according to Supplementary Note 10, comprising:

when receiving data, storing the transmission source neighboring device information attached to the received data as the receiver neighboring device information into the device information storage part of the wireless communication device; and on a basis of a result of comparison between the transmission source neighboring device information attached to the received data and the receiver neighboring device information stored in the device information storage part of the wireless communication device, determining whether to relay and transmit the received data to another wireless communication device.

(Supplementary Note 10.2)

The data relay method according to Supplementary Note 10 or 10.1, comprising:

when determining whether to relay data, in a case where the transmission source neighboring device information attached to the received data does not agree with the receiver neighboring device information stored in the device information storage part of the wireless communication device, determining to relay and transmit the received data to another wireless communication device.

(Supplementary Note 10.3)

The data relay method according to Supplementary Note 10.2, comprising:

when determining whether to relay data, in a case where the receiver neighboring device information stored in the device information storage part of the wireless communication device is a subset of the transmission source neighboring device information attached to the received data, determining not to relay the received data to another wireless communication device and, in a case where the receiver neighboring device information is not the subset, determining to relay and transmit the received data to another wireless communication device.

(Supplementary Note 10.4)

The data relay method according to any of Supplementary Notes 10 to 10.3, comprising:

when transmitting data, attaching identification information identifying the data to the data and transmitting the data to another wireless communication device, and also storing the identification information identifying the transmitted data into a relayed information storage part included in the wireless communication device; and when determining whether to relay data, in a case where information corresponding to the identification information of the received data attached to the data is not stored in the relayed information storage part, determining to relay and transmit the received data to another wireless communication device.

(Supplementary Note 10.5)

The data relay method according to any of Supplementary Notes 10 to 10.3, comprising:

when transmitting data, attaching identification information identifying the data to the data and transmitting the data to another wireless communication device, and also storing the identification information identifying the transmitted data and transmitted device information into the relayed information storage part included by the wireless communication device so as to be associated with each other, the transmitted device information being the device information stored in the device information storage part of the wireless communication device; and in a case where information corresponding to the identification information of the received data attached to the data is stored in the relayed information storage part and the transmitted device information stored in the relayed information storage part is different from the transmission source neighboring device information attached to the received data, determining to relay and transmit the received data to another wireless communication device.

(Supplementary Note 10.6)

The data relay method according to any of Supplementary Notes 10 to 10.5, comprising:

when receiving data, attaching valid period information to the device information to be stored into the device information storage part, and deleting the device information stored in the device information storage part on a basis of the valid period information.

(Supplementary Note 10.7)

The data relay method according to Supplementary Note 10.6, comprising:

determining a movement condition of the wireless communication device; and when receiving data, in accordance with movement condition information showing the movement condition of the wireless communication device, setting the valid period information to be attached to the device information to be stored into the device information storage part.

(Supplementary Note 10.8)

The data relay method according to Supplementary Note 10.6, comprising:

determining a movement condition of the wireless communication device;

when transmitting data, attaching movement condition information showing the movement condition of the wireless communication device to the data, and transmitting the data to another wireless communication device; and when receiving data, in accordance with the movement condition information attached to the received data and showing the movement condition of another wireless communication device having transmitted the data, setting the valid period information to be attached to the device information to be stored into the device information storage part.

The program described above is stored in a storage device or recorded on a computer-readable recording medium. For example the recording medium is a portable medium such as a flexible disk, an optical disk, a magneto-optical disk and a semiconductor memory.

Although the present invention has been described above with reference to the exemplary embodiments, the present invention is not limited to the exemplary embodiments provided above. The configurations and details of the present invention can be changed and modified in various manners that can be understood by those skilled in the art within the scope of the present invention.

The present invention is based upon and claims the benefit of priority from Japanese patent application No. 2015-062275, filed on Mar. 25, 2015, the disclosure of which is incorporated herein in its entirety by reference.

DESCRIPTION OF REFERENCE NUMERALS

10 relay communication device
100 communication application
101 data transmission and reception part
102 neighboring node information storage part
103 relayed information storage part
104 relay determination part
105 movement condition determination part
110 antenna
200 wireless communication device
201 transmission and reception part
202 relay determination part
210 device information storage part

What is claimed is:

1. A data relay method executed by a wireless communication device to determine whether to relay received data to another wireless communication device and relay and transmit received data to another wireless communication device, the method comprising:

when transmitting data, attaching device information identifying another wireless communication device that can establish wireless communication as transmission source neighboring device information to the data, and transmitting the data to another wireless communication device, the device information being stored in a device information storage part included in the wireless communication device;

when receiving data, storing transmission source device information identifying another wireless communication device having transmitted the data into the device information storage part included in the wireless communication device;

when determining whether to relay data, on a basis of a result of comparison between the transmission source neighboring device information attached to the received data and receiver neighboring device information that is the device information stored in the device information storage part of the wireless communication device, determining whether to relay and transmit the received data to another wireless communication device;

when determining whether to relay data, in a case where the transmission source neighboring device information attached to the received data does not agree with the receiver neighboring device information stored in the device information storage part of the wireless communication device, determining to relay and transmit the received data to another wireless communication device; and when determining whether to relay data, in a case where the receiver neighboring device information stored in the device information storage part of the wireless communication device is a subset of the transmission source neighboring device information attached to the received data, determining not to relay the received data to another wireless communication device and, in a case where the receiver neighboring device information is not the subset, determining to relay and transmit the received data to another wireless communication device.

2. A data relay method executed by a wireless communication device to determine whether to relay received data to another wireless communication device and relay and transmit received data to another wireless communication device, the method comprising:

when transmitting data, attaching device information identifying another wireless communication device that can establish wireless communication as transmission source neighboring device information to the data, and transmitting the data to another wireless communication device, the device information being stored in a device information storage part included in the wireless communication device;

when receiving data, storing transmission source device information identifying another wireless communication device having transmitted the data into the device information storage part included in the wireless communication device;

when determining whether to relay data, on a basis of a result of comparison between the transmission source neighboring device information attached to the received data and receiver neighboring device information that is the device information stored in the device information storage part of the wireless communication device, determining whether to relay and transmit the received data to another wireless communication device;

when transmitting data, attaching identification information identifying the data to the data and transmitting the data to another wireless communication device, and also storing the identification information identifying the transmitted data into a relayed information storage part included in the wireless communication device; and when determining whether to relay data, in a case where information corresponding to the identification information of the received data attached to the data is not stored in the relayed information storage part, determining to relay and transmit the received data to another wireless communication device.

3. A data relay method executed by a wireless communication device to determine whether to relay received data to another wireless communication device and relay and transmit received data to another wireless communication device, the method comprising:

when transmitting data, attaching device information identifying another wireless communication device that can establish wireless communication as transmission source neighboring device information to the data, and transmitting the data to another wireless communication device, the device information being stored in a device information storage part included in the wireless communication device;

when receiving data, storing transmission source device information identifying another wireless communication device having transmitted the data into the device information storage part included in the wireless communication device;

when determining whether to relay data, on a basis of a result of comparison between the transmission source neighboring device information attached to the received data and receiver neighboring device information that is the device information stored in the device information storage part of the wireless communication device, determining whether to relay and transmit the received data to another wireless communication device;

when transmitting data, attaching identification information identifying the data to the data and transmitting the data to another wireless communication device, and also storing the identification information identifying the transmitted data and transmitted device information into the relayed information storage part included by the wireless communication device so as to be associated with each other, the transmitted device information being the device information stored in the device information storage part of the wireless communication device; and in a case where information corresponding to the identification information of the received data attached to the data is stored in the relayed information storage part and the transmitted device information stored in the relayed information storage part is different from the transmission source neighboring device information attached to the received data, determining to relay and transmit the received data to another wireless communication device.

* * * * *